United States Patent
Zhou et al.

(10) Patent No.: US 9,529,475 B2
(45) Date of Patent: Dec. 27, 2016

(54) METHOD FOR CALIBRATION OF CAPACITIVE TOUCH SCREEN AND CAPACITIVE TOUCH APPARATUS

(71) Applicant: Huawei Device Co., LTD, Shenzhen (CN)

(72) Inventors: Jin Zhou, Shenzhen (CN); Hailong Liu, Shenzhen (CN)

(73) Assignee: Huawei Device Co., Ltd., Shenzhen (CN)

(*) Notice: Subject to any disclaimer, the term of this patent is extended or adjusted under 35 U.S.C. 154(b) by 651 days.

(21) Appl. No.: 14/011,165

(22) Filed: Aug. 27, 2013

(65) Prior Publication Data
US 2014/0062947 A1   Mar. 6, 2014

(30) Foreign Application Priority Data
Aug. 30, 2012  (CN) .......................... 2012 1 0315508

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01)

(58) Field of Classification Search
CPC ...... G06F 3/041; G06F 3/0412; G06F 3/0416; G06F 3/0418; G06F 3/044
USPC .......................................... 345/174; 324/601
See application file for complete search history.

(56) References Cited

U.S. PATENT DOCUMENTS

| | | |
|---|---|---|
| 2008/0158174 A1 | 7/2008 | Land et al. |
| 2010/0060609 A1 | 3/2010 | Doi et al. |
| 2011/0199105 A1 | 8/2011 | Otagaki et al. |
| 2011/0241907 A1 | 10/2011 | Cordeiro |
| 2011/0291669 A1* | 12/2011 | Chang .................. G06F 3/0418 324/601 |
| 2012/0026123 A1 | 2/2012 | Grunthaner et al. |
| 2012/0056851 A1 | 3/2012 | Chen et al. |
| 2012/0256875 A1* | 10/2012 | Ho .......................... G06F 3/044 345/174 |

FOREIGN PATENT DOCUMENTS

| | | |
|---|---|---|
| CN | 101833121 A | 9/2010 |
| CN | 201654747 U | 11/2010 |
| CN | 101963873 A | 2/2011 |

(Continued)

OTHER PUBLICATIONS

Extended European Search Report received in Application No. 13182144.9-1507 mailed Nov. 20, 2013, 7 pages.
(Continued)

*Primary Examiner* — David Tung
(74) *Attorney, Agent, or Firm* — Slater Matsil, LLP

(57) ABSTRACT

A method for calibration of a capacitive touch screen and a capacitive touch apparatus are disclosed. The calibration method includes obtaining a temporary reference capacitance value of a touch detection point of the capacitive touch screen when the capacitive touch screen powers up. A first difference between a backup reference capacitance value of the touch detection point and the temporary reference capacitance value of the touch detection point is obtained and a reference capacitance value of the touch detection point is determined according to the first difference and a first preset threshold.

10 Claims, 3 Drawing Sheets

(56) References Cited

FOREIGN PATENT DOCUMENTS

| CN | 102262481 A | 11/2011 |
|---|---|---|
| CN | 102346612 A | 2/2012 |
| CN | 102411448 A | 4/2012 |
| CN | 102520819 A | 6/2012 |
| CN | 102541382 A | 7/2012 |
| JP | 6375919 A | 4/1988 |
| JP | 06332604 A | 12/1994 |
| JP | 10091352 | 4/1998 |
| JP | 2010061598 A | 3/2010 |
| JP | 2010257046 A | 11/2010 |
| JP | 2011170617 A | 9/2011 |

OTHER PUBLICATIONS

International Search Report and Written Opinion received in Application No. PCT/CN2013/078557 mailed Oct. 17, 2013, 10 pages.

\* cited by examiner

METHOD FOR CALIBRATION OF CAPACITIVE TOUCH SCREEN AND CAPACITIVE TOUCH APPARATUS

CROSS-REFERENCE TO RELATED APPLICATION

This application claims priority to Chinese Patent Application No. 201210315508.1, filed on Aug. 30, 2012, which is hereby incorporated by reference in its entirety.

TECHNICAL FIELD

The present invention relates to the field of touch screen detection technologies, and in particular, to a method for calibration of a capacitive touch screen and a capacitive touch apparatus.

BACKGROUND

With the development of technology, a touch screen has gradually replaced a mechanical button panel and becomes a new man-machine interaction tool in the field of an electronic device. Among various touch screens, a capacitive touch screen is applied to more and more electronic device due to its higher transmittance, definition, and reliability.

A capacitive touch screen determines whether there is a touch operation according to the change of capacitance on the touch screen. Therefore, when powers up, a capacitive touch screen obtains a reference capacitance value when the capacitive touch screen is not interfered with. The reference capacitance value is used as a reference to detect the change of capacitance on the touch screen, so as to determine whether there is a touch operation on the touch screen.

The prior art records the following two methods for reference capacitance value calibration:

1) If a foreign matter such as a water stain exists on a touch screen when a reference capacitance value is obtained, the capacitance of the touch screen changes once the foreign matter is removed. If the touch screen detects that the duration for maintaining a changed capacitance value exceeds a specific duration, the touch screen forcibly updates the reference capacitance value. However, when the calibration method is adopted, the reference capacitance value may also be updated if a touch screen is touched by a human hand on purpose for a long time, resulting in wrong calibration and a potential operation failure in a normal touch.

2) If a considerable touch area is pressed (for example, by a palm) on a touch screen when a, reference capacitance value is obtained, the capacitance change values detected by the touch screen may be several positive and negative values. When the proportion of positive values to negative values reaches a certain threshold, the touch screen adjusts the reference capacitance value. However, in this calibration method, the proportion of positive changes to negative changes is difficult to define; moreover, the capacitance value of a touch screen may be influenced by a conductor or a charging device near the touch screen. Therefore, this calibration method is neither stable nor accurate.

SUMMARY

The embodiments of the present invention provide a method for calibration of a capacitive touch screen and a capacitive touch apparatus, which may calibrate a capacitive touch screen, avoid wrong calibration of the capacitive touch screen, and further avoid an operation failure on the capacitive touch screen.

To achieve the preceding objective, the embodiments of the present invention adopt the following technical solutions:

In a first aspect, a method for calibration of a capacitive touch screen is provided, including:

obtaining a temporary reference capacitance value of a touch detection point, when a capacitive touch screen powers up;

obtaining a first difference between a backup reference capacitance value of the touch detection point and the temporary reference capacitance value of the touch detection point; and determining a reference capacitance value of the touch detection point according to the first difference and a first preset threshold.

In a first possible implementation manner, in combination with the first aspect, determining a reference capacitance value of the touch detection point according to the first difference and a first preset threshold includes:

adopting the temporary reference capacitance value as the reference capacitance value, if the first difference is less than the first preset threshold;

obtaining a detected capacitance value of the touch detection point, if the first difference is greater than the first preset threshold;

obtaining a second difference between the detected capacitance value of the touch detection point and the temporary reference capacitance value of the touch detection point; and determining the reference capacitance value of the touch detection point according to the second difference and a second preset threshold.

In a second possible implementation manner, in combination with the first possible implementation manner, determining the reference capacitance value of the touch detection point according to the second difference and a second preset threshold includes:

updating the reference capacitance value of the touch detection point to be the temporary reference capacitance value, if the second difference is less than the second preset threshold;

obtaining a third difference between the second difference and the first difference, if the second difference is greater than the second preset threshold; and determining the reference capacitance value of the touch detection point according to the third difference and a third preset threshold.

In a third possible implementation manner, in combination with the second possible implementation manner, determining the reference capacitance value of the touch detection point according to the third difference and a third preset difference includes:

updating the reference capacitance value of the touch detection point to be the backup reference capacitance value, if the third difference is less than the third preset threshold; and updating the reference capacitance value of the touch detection point to be the detected capacitance value, if the third difference is greater than the third preset threshold.

In a fourth possible implementation manner, in combination with the third possible implementation manner, the method further includes:

updating the backup reference capacitance value to be the temporary reference capacitance value, if the second difference is less than the second preset threshold; and updating the backup reference capacitance value to be the detected capacitance value, if the third difference is greater than the third preset threshold.

In a fifth possible implementation manner, in combination with the third or fourth possible implementation manner, the method further includes:

updating reference capacitance values of other touch detection points of the touch screen to be the temporary reference capacitance value, if the second difference is less than the second preset threshold;

updating reference capacitance values of other touch detection points of the touch screen to be the backup reference capacitance value, if the third difference is less than the third preset threshold; and updating reference capacitance values of other touch detection points of the touch screen to be the detected capacitance value, if the third difference is greater than the third preset threshold.

In a second aspect, a capacitive touch apparatus is provided. The capacitive touch apparatus includes a capacitive touch screen and a processor:

the processor, configured to, when the capacitive touch screen powers up, obtain a temporary reference capacitance value of a touch detection point and a first difference between a backup reference capacitance value of the touch detection point and the temporary reference capacitance value of the touch detection point; and the processor, further configured to obtain a reference capacitance value of the touch detection point according to the first difference and a first preset threshold.

In a first possible implementation manner, in combination with the second aspect, determining a reference capacitance value of the touch detection point by the processor according to the first difference and a first preset threshold specifically includes:

adopting, by the processor, the temporary reference capacitance value as the reference capacitance value, if the first difference is less than the first preset threshold;

obtaining, by the processor, a detected capacitance value of the touch detection point, if the first difference is greater than the first preset threshold;

obtaining a second difference between the detected capacitance value of the touch detection point and the temporary reference capacitance value of the touch detection point; and determining the reference capacitance value of the touch detection point according to the second difference and a second preset threshold.

In a second possible implementation manner, in combination with the first possible implementation manner, determining the reference capacitance value of the touch detection point by the processor according to the second difference and the second preset threshold specifically includes:

updating, by the processor, the reference capacitance value of the touch detection point to be the temporary reference capacitance value, if the second difference is less than the second preset threshold;

obtaining, by the processor, a third difference between the second difference and the first difference, if the second difference is greater than the second preset threshold; and determining the reference capacitance value of the touch detection point according to the third difference and a third preset threshold.

In a third possible implementation manner, in combination with the second possible implementation manner, determining the reference capacitance value of the touch detection point by the processor according to the third difference and a third preset difference specifically includes:

updating the reference capacitance value of the touch detection point to be the backup reference capacitance value, if the third difference is less than the third preset threshold; and updating, by the processor, the reference capacitance value of the touch detection point to be the detected capacitance value, if the third difference is greater than a third preset threshold;

In a fourth possible implementation manner, in combination with the third possible implementation manner, the processor is further configured to:

update the backup reference capacitance value to be the temporary reference capacitance value, if the second difference is less than the second preset threshold; and update the backup reference capacitance value to be the detected capacitance value, if the third difference is greater than the third preset threshold.

In a fifth possible implementation manner, in combination with the third or fourth possible implementation manner, the processor is further configured to:

update reference capacitance values of other touch detection points of the touch screen to be the temporary reference capacitance value, if the second difference is less than the second preset threshold;

update reference capacitance values of other touch detection points of the touch screen to be the backup reference capacitance value, if the third difference is less than the third preset threshold; and update reference capacitance values of other touch detection points of the touch screen to be the detected capacitance value, if the third difference is greater than the third preset threshold.

According to the description of the technical solutions, the embodiments of the present invention provide a method for calibration of a capacitive touch screen and a touch apparatus. A reference capacitance value of a capacitive touch screen may be affected by an external environment (for example, humidity and temperature) and external interference (for example, a foreign matter or a touch by a hand on the touch screen). Therefore, the reference capacitance value of a touch detection point is determined according to a first difference between a backup reference capacitance value of the touch detection point of the touch screen and a temporary reference capacitance value during power-up of the touch screen, where the backup reference capacitance value is a reference capacitance value of the touch screen obtained in an environment with no interference, and the temporary reference capacitance value is detected in a particular environment with interference when the touch screen powers up.

When the capacitive touch screen powers up, the touch apparatus obtains a temporary reference capacitance value of a touch detection point of the capacitive touch screen first, and then obtains a first difference between the temporary reference capacitance value of the touch detection point and a backup reference capacitance value of the touch detection point. If the first difference is less than a first preset threshold, it indicates that the environment where the capacitive touch screen powers up is rather close to the environment where the backup reference capacitance value is measured; furthermore, it may be considered that the touch screen is not interfered with when it powers up, and the temporary reference capacitance value may be used as the reference capacitance value of the touch screen.

When the first difference is greater than the first preset threshold, it indicates that the environment when the touch screen powers up is greatly different from the environment where the backup reference capacitance value is measured, or the touch screen is interfered with when it powers up. Then, the touch apparatus needs to further calibrate the touch point. The method for calibration of a capacitive touch screen and the touch apparatus take account of a backup reference capacitance value, so there is a reference for calibration of the touch screen. Therefore, the calibration method may calibrate the reference capacitance value of the touch screen more accurately, rather than directly calibrating the capacitance value of the touch screen when the touch screen powers up, thereby further avoiding an operation failure on the touch screen.

BRIEF DESCRIPTION OF DRAWINGS

To illustrate the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Embodiment 1

Figure 1:
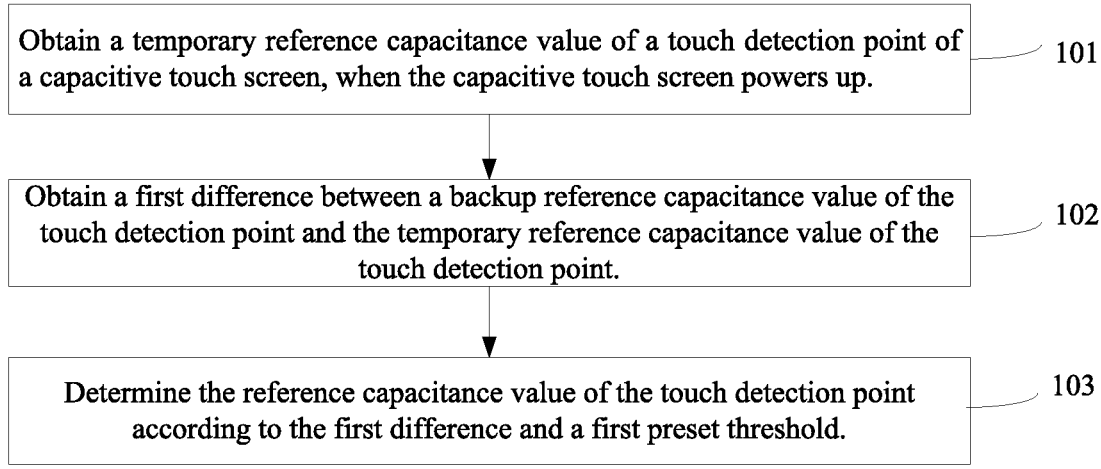
FIG. 1 is a schematic flowchart of a method for calibration of a capacitive touch screen according to an embodiment of the present invention.

An embodiment of the present invention provides a method for calibration of a capacitive touch screen. As shown in FIG. 1, the method includes:

101: A capacitive touch apparatus obtains a temporary reference capacitance value of a touch detection point of a capacitive touch screen, when the capacitive touch screen powers up.

The temporary reference capacitance value is a sample capacitance value, obtained by the capacitive touch apparatus, of a touch detection point each time the capacitive touch screen powers up. For instance, when a mobile phone with a capacitive touch screen starts up, the mobile phone adopts a sample capacitance value of a touch detection point at this moment as a temporary reference capacitance value of the capacitive touch screen.

102: The capacitive touch apparatus obtains a first difference between a backup reference capacitance value of the touch detection point and the temporary reference capacitance value of the touch detection point.

The backup reference capacitance value of the touch detection point is a reference capacitance value when the touch screen is not interfered with in an environment.

Specifically, the backup reference capacitance value may be a capacitance value set when the touch screen is delivered from the factory. Of course, it may also be a reference capacitance value after the calibration performed with the method.

103: Determine the reference capacitance value of the touch detection point according to the first difference and a first preset threshold.

The reference capacitance value is a capacitance value used when the capacitive touch apparatus detects whether there is a touch operation. Specifically, the capacitive touch apparatus detects whether there is a touch operation by comparing a detected capacitance value with the reference capacitance value.

Determining the reference capacitance value of the touch detection point according to the first difference and a first preset threshold may be specifically: if the first difference is less than the first preset threshold, it indicates that the environment of the touch detection point does not change, and the backup reference capacitance value may be selected as the reference capacitance value, or the temporary reference capacitance value may be selected as the reference capacitance value; if the first difference is greater than the first preset threshold, it indicates that the touch point may be interference with or the environment of the touch point changes, and neither the backup reference capacitance value nor the temporary reference capacitance value is accurate enough to be the reference capacitance value because selecting the backup reference capacitance value or the temporary reference capacitance value as the reference capacitance value may result in a wrong operation, and in this way, the touch screen may adopt other methods to calibrate the reference capacitance value of the touch detection point. Specifically, when a preset duration ends, a capacitance value of the touch point may be obtained again and used as the reference capacitance value. Of course, other methods may be adopted to calibrate the capacitance value of the touch point, which are not limited by the embodiments of the present invention.

According to the description of the technical solutions, the embodiment of the present invention provides a method for calibration of a capacitive touch screen. A reference capacitance value of a capacitive touch screen may be affected by an external environment (for example, humidity and temperature) and external interference (for example, a foreign matter or a touch by a hand on the touch screen). Therefore, the reference capacitance value of a touch detection point is determined according to a first difference between a backup reference capacitance value of the touch point of the touch screen and a temporary reference capacitance value during power-up of the touch screen, where the backup reference capacitance value is a reference capacitance value of the touch screen obtained in an environment with no interference, and the temporary reference capacitance value is a reference capacitance value detected in a particular environment with interference when the touch screen powers up.

When the capacitive touch screen powers up, the touch apparatus obtains a temporary reference capacitance value of a touch detection point of the capacitive touch screen first, and then obtains a first difference between the temporary reference capacitance value of the touch detection point and a backup reference capacitance value of the touch detection point. If the first difference is less than a first preset threshold, it indicates that the environment where the capacitive touch screen powers up is rather close to the environment where the backup reference capacitance value is measured; furthermore, it may be considered that the touch screen is not interfered with when it powers up, and the temporary reference capacitance value may be used as the reference capacitance value of the touch screen.

When the first difference is greater than the first preset threshold, it indicates that the environment when the touch screen powers up is greatly different from the environment where the backup reference capacitance value is measured, or the touch screen is interfered with when it powers up. Then, the touch apparatus needs to further calibrate the touch point. The method for calibration of a capacitive touch screen takes account of a backup reference capacitance value, so there is a reference for calibration of the touch screen. Therefore, the calibration method may calibrate the reference capacitance value of the touch screen more accurately, rather than directly calibrating the capacitance value of the touch screen when the touch screen powers up, thereby further avoiding an operation failure on the touch screen.

Embodiment 2

Figure 2:
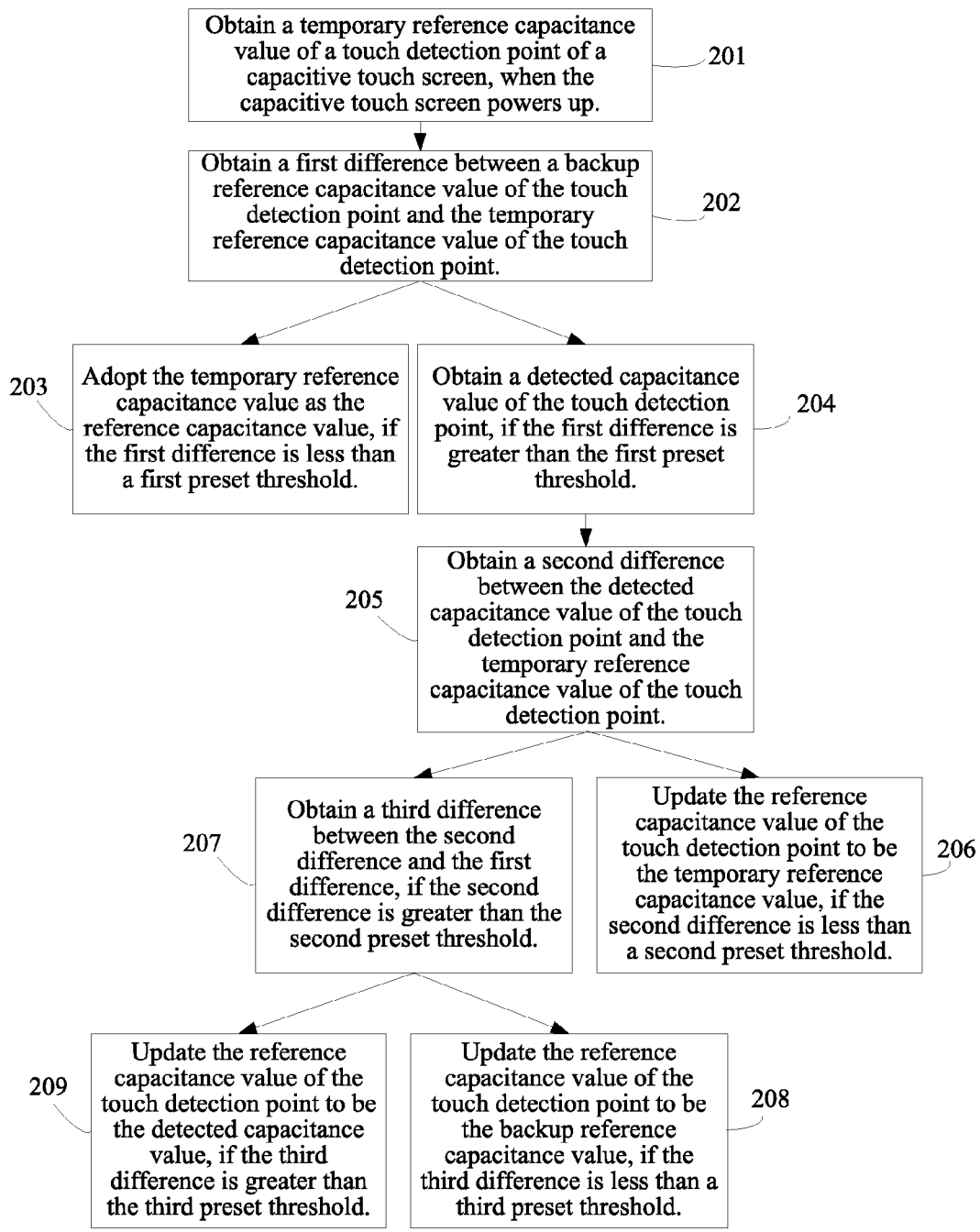
FIG. 2 is a schematic flowchart of another method for calibration of a capacitive touch screen according to an embodiment of the present invention.

An embodiment of the present invention provides a method for calibration of a capacitive touch screen. As shown in FIG. 2, the method includes:

201: A capacitive touch apparatus obtains a temporary reference capacitance value of a touch detection point of a capacitive touch screen, when the capacitive touch screen powers up.

The temporary reference capacitance value is a sample capacitance value, obtained by the capacitive touch apparatus, of the touch detection point each time the capacitive touch screen powers up. For instance, when a mobile phone with a capacitive touch screen starts up, the mobile phone adopts a sample capacitance value of a touch detection point at this moment as a temporary reference capacitance value of the capacitive touch screen.

202: The capacitive touch apparatus obtains a first difference between a backup reference capacitance value of the touch detection point and the temporary reference capacitance value of the touch detection point.

The backup reference capacitance value of the touch detection point is a reference capacitance value when the touch screen is not interfered with in an environment.

Specifically, the backup reference capacitance value may be a capacitance value set when the touch screen is delivered from the factory. Of course, it may also be a reference capacitance value after the calibration performed with the method.

The reference capacitance value is a capacitance value used when the capacitive touch apparatus detects whether there is a touch operation. Specifically, the capacitive touch apparatus detects whether there is a touch operation by comparing a detected capacitance value with the reference capacitance value.

If a backup reference capacitance value of the touch detection point of the capacitive touch screen is a, a temporary reference capacitance value is b, and a first difference is l, then l=a−b.

203: The capacitive touch apparatus adopts the temporary reference capacitance value as the reference capacitance value, if the first difference is less than a first preset threshold.

If the first preset threshold is o and the reference capacitance value is c, then when l<o, it indicates that the environment where the temporary reference capacitance value of the touch detection point is obtained is close to the environment where the backup reference capacitance value is detected. It is considered that a temporary reference is actually obtained by a detected value at that time, so it is closer to an actual situation and yields a better touch result. In this case, the apparatus adopt the temporary reference capacitance value as the reference capacitance value, that is, the reference capacitance value c=b.

204: The capacitive touch apparatus obtains a detected capacitance value of the touch detection point, if the first difference is greater than a first preset threshold.

When l>o, it indicates that the environment where the temporary reference capacitance value of the touch detection point is obtained changes when compared with the environment where the backup reference capacitance value is detected, and/or the touch detection point is interfered with. For instance, the temperature and humidity of the environment where the capacitive touch screen is located changes, and the touch detection point is interfered with a water stain or the like.

To obtain an accurate reference capacitance value, at this time, the capacitive touch apparatus needs to further obtain a current detected capacitance value of the touch detection point.

205: The capacitive touch apparatus obtains a second difference between the detected capacitance value of the touch detection point and the temporary reference capacitance value of the touch detection point.

If the detected capacitance value of the touch detection point is d, the second difference is m, then m=d−b.

206: The capacitive touch apparatus updates the reference capacitance value of the touch detection point to be the temporary reference capacitance value, if the second difference is less than a second preset threshold.

If the second preset threshold is p, then when m<p, it indicates that the current environment of the touch detection point is close to the environment where the temporary reference capacitance value is detected, but it changes when compared with the environment where the backup reference capacitance value is detected. For instance, the temperature and humidity of the environment where the capacitive touch screen is located changes. In this case, the capacitive touch apparatus adopts the temporary reference capacitance value as the reference capacitance value, that is, c=b.

207: The capacitive touch apparatus obtains a third difference between the second difference and the first difference, if the second difference is greater than the second preset threshold.

If the second difference is greater than the second preset threshold, it indicates that the current environment of the touch detection point may change when compared with the environment where the temporary reference capacitance value is detected, or it is possible that the touch detection point is interfered with, which results in that a difference between the detected capacitance value and the temporary reference capacitance value is large.

To obtain an accurate reference capacitance value, at this time, the touch apparatus needs to further obtain a third difference between the second difference and the first difference.

If a third difference is n, when m>p, n=m−1=(d−b)−(a−b)=d−a.

208: The capacitive touch apparatus updates the reference capacitance value of the touch detection point to be the backup reference capacitance value, if the third difference is less than a third preset threshold.

If the third threshold is q, when n<q, that is, d−a<q, it indicates that the current environment of the touch detection point is again close to the environment where the backup reference capacitance value is detected. In this way, it may be determined that the touch detection point is interfered with when the temporary reference capacitance value is detected.

In this case, the capacitive touch apparatus adopts the backup reference capacitance value as the reference capacitance value, that is, c=a.

209: The capacitive touch apparatus updates the reference capacitance value of the touch detection point to be the detected capacitance value, if the third difference is greater than the third preset threshold.

When n>q, that is, d−a>q, it indicates that the touch detection point is interfered with when the temporary reference capacitance value is obtained, and meanwhile, the current environment of the touch detection point changes when compared with the environment where the backup reference capacitance value is detected, for instance, when the humidity or temperature of the touch screen changes and power-up occurs by pressing a considerable area with a hand, the detected capacitance value, rather than the temporary reference capacitance value and the backup reference capacitance value, is adopted as the reference capacitance value of the touch detection point, that is, c=d.

Optionally, if the second difference is less than the second preset threshold, that is, m<p, it indicates that the current environment of the touch detection point changes when compared with the environment where the backup reference capacitance value is detected. Generally, the environment where the touch screen is located does not change dramatically in a period of time. However, the current environment of the capacitive touch screen may change dramatically when compared the environment where the backup reference capacitance value is detected when the capacitive touch screen is delivered from the factory. To simplify the process in which the capacitive touch apparatus calibrates the reference capacitance value, if the second difference is less than the second preset threshold, the backup reference capacitance value may be updated to be the temporary reference capacitance value, that is, a=b. In this way, during startup at a next time, the capacitive touch apparatus may update the reference capacitance value only by determining the first threshold, if the touch screen is not interfered with and the environment is close to the environment where power-up occurs at a previous time.

Similarly, to simplify a next calibration process, the backup reference capacitance value may be updated to be the detected capacitance value, if the third difference is greater than the third preset threshold.

Optionally, when the environment where the touch apparatus is located changes, and/or the touch apparatus is interfered with by an external environment, after the touch detection point is calibrated, reference capacitance values of other touch detection points may be updated to be the calibrated reference capacitance value of the touch detection point. The process is described as follows:

updating reference capacitance values of other touch detection points of the touch screen to be the temporary reference capacitance value, if the second difference is less than the second preset threshold;

updating reference capacitance values of other touch detection points of the touch screen to be the backup reference capacitance value, if the third difference is less than the third preset threshold; and updating reference capacitance values of other touch detection points of the touch screen to be the detected capacitance value, if the third difference is greater than the third preset threshold.

According to the description of the technical solutions, the embodiment of the present invention provides a method for calibration of a capacitive touch screen. A reference capacitance value of a capacitive touch screen may be affected by an external environment (for example, humidity and temperature) and external interference (for example, a foreign matter or a touch by a hand on the touch screen). Therefore, the method introduces a backup reference capacitance value, a temporary reference capacitance value during power-up of the touch screen, and a detected capacitance value, where the backup reference capacitance value is a reference capacitance value of the touch screen in a certain environment where the touch screen is not interfered with, the temporary reference capacitance value is a reference capacitance value detected when the touch screen powers up this time in an environment and under interference, and the detected capacitance value is a capacitance value detected at different detection time after the touch screen powers up.

When the capacitive touch screen powers up, the touch apparatus obtains a temporary reference capacitance value of a touch detection point of the capacitive touch screen first, and then obtains a first difference between the temporary reference capacitance value of the touch detection point and a backup reference capacitance value of the touch detection point. If the first difference is less than a first preset threshold, it indicates that the environment when the touch screen powers up is rather close to the environment where the backup reference capacitance value is measured; furthermore, it may be considered that the touch screen is not interfered with when it powers up, and the temporary reference capacitance value may be used as the reference capacitance value of the touch screen.

When the first difference is greater than the first preset threshold, it indicates that the environment when the touch screen powers up is greatly different from the environment where the backup reference capacitance value is measured, or the touch screen is interfered with when it powers up. Then, a detected capacitance value of the touch detection point and a second difference between the detected capacitance value of the touch detection point and the temporary reference capacitance value of the touch detection point are obtained. If the second difference is less than a second preset threshold, it indicates that the environment when the touch screen powers up is different from the environment where the backup reference capacitance value is measured. In this case, the reference capacitance value of the touch screen is determined as the temporary reference capacitance value.

If the second difference is greater than the second preset threshold, a third difference between the second difference and the first difference is obtained. If the third difference is less than a third preset threshold, it indicates that the environment after the touch screen powers up is slightly different from the environment where the backup reference capacitance value is measured, but the touch screen is interfered with when it powers up, and therefore, the backup reference capacitance value is determined as the reference capacitance value of the touch screen.

If the third difference is greater than the third preset threshold, it indicates that the environment after the touch screen powers up is greatly different from the environment where the backup reference capacitance value is measured, and the touch screen is interfered with when it powers up, and therefore, the reference capacitance value is updated to be the detected capacitance value.

The method for calibration of a capacitive touch screen takes account of environment change and interference, so the calibration method can calibrate the reference capacitance value of the touch screen accurately, thereby avoiding an operation failure on the touch screen.

Embodiment 3

Figure 3:
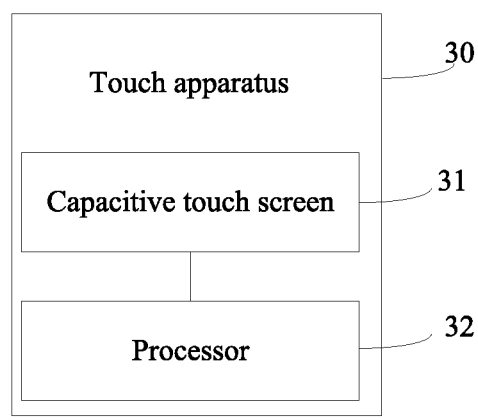
FIG. 3 is a structural schematic diagram of a touch apparatus according to an embodiment of the present invention.

An embodiment of the present invention further provides a capacitive touch apparatus 30, which includes a capacitive touch screen 31. As shown in FIG. 3, the touch apparatus 30 further includes a processor 32.

The processor 32 is configured to, when the capacitive touch screen 31 powers up, obtain a temporary reference capacitance value of a touch detection point of the capacitive touch screen 31 and a first difference between a backup reference capacitance value of the touch detection point and the temporary reference capacitance value of the touch detection point.

The temporary reference capacitance value of the touch detection point is a sample capacitance value, obtained by the capacitive touch apparatus 30, of the touch detection point each time the capacitive touch screen 31 powers up. For instance, when a mobile phone with a capacitive touch screen starts up, the mobile phone adopts a sample capacitance value of a touch detection point at this moment as a temporary reference capacitance value of the capacitive touch screen.

The backup reference capacitance value is a reference capacitance value when the touch screen is not interfered with in an environment. Specifically, the backup reference capacitance value may be a capacitance value set when the touch screen is delivered from the factory. Of course, it may also be a reference capacitance value after the calibration performed with the method.

The processor 32 is further configured to determine the reference capacitance value of the touch detection point according to the first difference and a first preset threshold.

The reference capacitance value is a capacitance value used when the capacitive touch apparatus 30 detects whether there is a touch operation. Specifically, the capacitive touch apparatus 30 detects whether there is a touch operation by comparing a detected capacitance value with the reference capacitance value.

That the processor 32 determines the reference capacitance value of the touch detection point according to the first difference and the first preset threshold may be: if the first difference is less than the first preset threshold, it indicates that the environment of the touch detection point does not change, and the backup reference capacitance value may be selected as the reference capacitance value, or the temporary reference capacitance value may be selected as the reference capacitance value; if the first difference is greater than the first preset threshold, it indicates that the touch point may be interference with or the environment of the touch point changes, and neither the backup reference capacitance value nor the temporary reference capacitance value is accurate enough to be the reference capacitance value because selecting the backup reference capacitance value or the temporary reference capacitance value as the reference capacitance value may result in a wrong operation, and in this way, the touch screen may adopt other methods to calibrate the reference capacitance value of the touch detection point. Specifically, when a preset duration ends, a capacitance value of the touch point may be obtained again and used as the reference capacitance value. Of course, other methods may be adopted to calibrate the capacitance value of the touch point, which are not limited by the embodiments of the present invention.

Optionally, that the processor 32 determines the reference capacitance value of the touch detection point according to the first difference and the first preset threshold specifically includes:

adopting the backup reference capacitance value as the reference capacitance value, if the first difference is less than the first preset threshold;

obtaining a detected capacitance value of the touch detection point, when the first difference is greater than the first preset threshold;

obtaining a second difference between the detected capacitance value of the touch detection point and the temporary reference capacitance value of the touch detection point; and determining the reference capacitance value of the touch detection point according to the second difference and a second preset threshold.

If the first difference is less than the first preset threshold, it indicates that the environment where the temporary reference capacitance value of the touch detection point is obtained is close to the environment where the backup reference capacitance value is detected. It is considered that the temporary reference capacitance value is actually obtained by a detected value at that time, so it is closer to an actual situation and yields a better touch result. In this case, the temporary reference capacitance value is adopted as the reference capacitance value.

If the first difference is greater than the first preset threshold, it indicates that the environment where the temporary reference capacitance value is obtained changes when compared with the environment where the backup reference capacitance value is detected, and/or the touch detection point is interfered with. For instance, the temperature and humidity of the environment where the capacitive touch screen 31 is located changes, and the touch detection point is interfered with a water stain or the like. To obtain an accurate reference capacitance value, at this time, the processor 32 needs to further obtain a current detected capacitance value of the touch detection point.

Optionally, that the processor 32 determines the reference capacitance value of the touch detection point according to the second difference and the second preset threshold specifically includes:

updating the reference capacitance value of the touch detection point to be the temporary reference capacitance value, if the second difference is less than the second preset threshold;

obtaining a third difference between the second difference and the first difference, if the second difference is greater than the second preset threshold; and determining the reference capacitance value of the touch detection point according to the third difference and a third preset threshold.

If the second difference is less than the second preset threshold, it indicates that the current environment of the touch detection point is close to the environment where the temporary reference capacitance value is detected, but it changes when compared with the environment where the backup reference capacitance value is detected. For instance, the temperature and humidity of the environment where the capacitive touch screen 31 is located changes. In this case, the processor 32 adopts the temporary reference capacitance value as the reference capacitance value.

If the second difference is greater than the second preset threshold, it indicates that the current environment of the touch detection point may change when compared with the environment where the temporary reference capacitance value is detected, or it is possible that the touch detection point is interfered with, which results in that a difference between the detected capacitance value and the temporary reference capacitance value is large. To obtain an accurate reference capacitance value, at this time, the processor 32 needs to further obtain a third difference between the second difference and the first difference.

Optionally, that the processor determines the reference capacitance value of the touch detection point according to the third difference and the third preset threshold specifically includes:

updating the reference capacitance value of the touch detection point to be the backup reference capacitance value, if the third difference is less than the third preset threshold; and updating the reference capacitance value of the touch detection point to be the detected capacitance value, if the third difference is greater than the third preset threshold.

If the third difference is less than the third preset threshold, it indicates that the current environment of the touch detection point is again close to the environment where the backup reference capacitance value is detected. In this way, it may be determined that the touch detection point is interfered with when the temporary reference capacitance value is detected. In this case, the processor 32 adopts the backup reference capacitance value as the reference capacitance value.

If the third difference is greater than the third preset threshold, it indicates that the touch detection point is interfered with when the temporary reference capacitance value is obtained, and meanwhile, the current environment of the touch detection point changes when compared with the environment where the backup reference capacitance value is detected, for instance, when the humidity or temperature of the capacitive touch screen 31 changes and power-up occurs by pressing a considerable area with a hand, the detected capacitance value, rather than the temporary reference capacitance value and the backup reference capacitance value, is adopted as the reference capacitance value.

Optionally, the processor 32 is further configured to update the backup reference capacitance value to be the temporary reference capacitance value if the second difference is less than the second preset threshold.

If the second difference is less than the second preset threshold, it indicates that the current environment of the touch detection point is close to the environment where the temporary reference capacitance value is detected, but it changes when compared with the environment where the backup reference capacitance value is detected. To simplify the process in which the capacitive touch apparatus 30 calibrates the reference capacitance value, the processor 32 may update the backup reference capacitance value to be the temporary reference capacitance value. In this way, during startup at a next time, if the touch screen 31 is not interfered with and the environment is close to the environment where power-up occurs at a previous time, the capacitive touch apparatus 30 may update the reference capacitance value only by determining the first preset threshold.

The processor 32 is further configured to update the backup reference capacitance value to be the detected capacitance value, if the third difference is greater than the third preset threshold.

Optionally, when the environment where the touch apparatus 30 is located changes, and/or the touch apparatus 30 is interfered with by an external environment, after the touch detection point is calibrated, reference capacitance values of other touch detection points may be updated to be the calibrated reference capacitance value of the touch detection point. Therefore, the processor 32 is further configured to:

update reference capacitance values of other touch detection points of the touch screen 31 to be the temporary reference capacitance value, if the second difference is less than the second preset threshold;

update reference capacitance values of other touch detection points of the touch screen 31 to be the backup reference capacitance value, if the third difference is less than the third preset threshold; and update reference capacitance values of other touch detection points of the touch screen 31 to be the detected capacitance value, if the third difference is greater than the third preset threshold.

According to the description of the technical solutions, the embodiment of the present invention provides a capacitive touch apparatus which includes a capacitive touch screen and a processor. The reference capacitance value of the capacitive touch screen may be influenced by an external environment (for example, humidity and temperature) and external interference (for example, a foreign matter or a touch by a hand on the touch screen). Therefore, when the capacitive touch screen powers up, the processor first obtains a temporary reference capacitance value of a touch detection point of the capacitive touch screen, and then obtains a first difference between a backup reference capacitance value of the touch detection point and the temporary reference capacitance value of the touch detection point. If the first difference is less than a first preset threshold, it indicates that the environment where the capacitive touch screen powers up is rather close to the environment where the backup reference capacitance value is measured; furthermore, it may be considered that the touch screen is not interfered with when it powers up, and the temporary reference capacitance value may be used as the reference capacitance value of the touch screen.

When the first difference is greater than the first preset threshold, it indicates that the environment when the touch screen powers up is greatly different from the environment where the backup reference capacitance value is measured, or the touch screen is interfered with when it powers up. Then, a detected capacitance value of the touch detection point and a second difference between the detected capacitance value of the touch detection point and the temporary reference capacitance value of the touch detection point are obtained. If the second difference is less than a second preset threshold, it indicates that the environment when the touch screen powers up is different from the environment where the backup reference capacitance value is measured. In this case, the reference capacitance value of the touch screen is determined as the temporary reference capacitance value.

If the second difference is greater than the second preset threshold, a third difference between the second difference and the first difference is obtained. If the third difference is less than a third preset threshold, it indicates that the environment after the touch screen powers up is slightly different from the environment where the backup reference capacitance value is measured, but the touch screen is interfered with when it powers up, and therefore, the backup reference capacitance value is determined as the reference capacitance value of the touch screen.

If the third difference is greater than the third preset threshold, it indicates that the environment after the touch screen powers up is greatly different from the environment where the backup reference capacitance value is measured, and the touch screen is interfered with when it powers up, and therefore, the reference capacitance value is updated to be the detected capacitance value.

The capacitive touch apparatus takes account of environment change and interference, so the capacitive touch apparatus can calibrate the reference capacitance value of the touch screen accurately, thereby avoiding an operation failure on the touch screen.

Those of ordinary skill in the art should understand that all or a part of the steps of the method according to the embodiments may be implemented by a program instructing relevant hardware. The program may be stored in a computer readable storage medium. When the program is run, the steps of the method according to the embodiments are performed. The storage medium may be any medium capable of storing program codes, such as a ROM, a RAM, a magnetic disk or an optical disk.

The description is merely about the specific embodiments of the present invention, but is not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope of the claims.

What is claimed is:

1. A method for calibration of a capacitive touch screen, the method comprising:
   when a capacitive touch screen powers up, obtaining a temporary reference capacitance value of a touch detection point of the capacitive touch screen;
   obtaining a first difference between a backup reference capacitance value of the touch detection point and the temporary reference capacitance value of the touch detection point; and
   determining a reference capacitance value of the touch detection point according to the first difference and a first preset threshold, wherein the first preset threshold is a value greater than zero, and wherein determining the reference capacitance value of the touch detection point comprises:
      in response to the first difference being less than the first preset threshold, adopting the temporary reference capacitance value as the reference capacitance value;
      in response to the first difference being greater than the first preset threshold,
         obtaining a detected capacitance value of the touch detection point;
         obtaining a second difference between the detected capacitance value of the touch detection point and the temporary reference capacitance value of the touch detection point;
      when the second difference is less than a second preset threshold, updating the reference capacitance value of the touch detection point to be the temporary reference capacitance value; and
      when the second difference is greater than the second preset threshold, obtaining a third difference between the second difference and the first difference and determining the reference capacitance value of the touch detection point according to the third difference and a third preset threshold; and
   using the reference capacitance value to detect a touch on the capacitive touch screen.

2. The method according to claim is claim 1, wherein determining the reference capacitance value of the touch detection point according to the third difference and the third preset threshold comprises:
   when the third difference is less than the third preset threshold, updating the reference capacitance value of the touch detection point to be the backup reference capacitance value; and
   when the third difference is greater than the third preset threshold, updating the reference capacitance value of the touch detection point to be the detected capacitance value.

3. The method according to claim 2, further comprising:
   updating reference capacitance values of other touch detection points of the touch screen to be the temporary reference capacitance value, if the second difference is less than the second preset threshold;
   updating reference capacitance values of other touch detection points of the touch screen to be the backup reference capacitance value, if the third difference is less than the third preset threshold; and
   updating reference capacitance values of other touch detection points of the touch screen to be the detected capacitance value, if the third difference is greater than the third preset threshold.

4. The method according to claim 2, further comprising:
   updating the backup reference capacitance value of the touch detection point to be the temporary reference capacitance value when the second difference is less than the second preset threshold; and
   updating the backup reference capacitance value to be the detected capacitance value when the third difference is greater than the third preset threshold.

5. The method according to claim 4, further comprising:
   updating reference capacitance values of other touch detection points of the touch screen to be the temporary reference capacitance value, if the second difference is less than the second preset threshold;
   updating reference capacitance values of other touch detection points of the touch screen to be the backup reference capacitance value, if the third difference is less than the third preset threshold; and
   updating reference capacitance values of other touch detection points of the touch screen to be the detected capacitance value, if the third difference is greater than the third preset threshold.

6. A capacitive touch apparatus comprising:
   a capacitive touch screen; and
   a processor configured to:
      when the capacitive touch screen powers up, obtain a temporary reference capacitance value of a touch detection point of the capacitive touch screen and a first difference between a backup reference capacitance value of the touch detection point and the temporary reference capacitance value of the touch detection point;

obtain a reference capacitance value of the touch detection point according to the first difference and a first preset threshold; and use the reference capacitance value to detect a touch on the capacitive touch screen;

wherein a value of the first preset threshold is not zero, and wherein obtaining the reference capacitance value of the touch detection point comprises:

in response to the first difference being less than the first preset threshold, adopting the temporary reference capacitance value as the reference capacitance value;

in response to the first difference being greater than the first preset threshold, obtaining a detected capacitance value of the touch detection point;

obtaining a second difference between the detected capacitance value of the touch detection point and the temporary reference capacitance value of the touch detection point;

in response to the second difference being less than a second preset threshold, updating the reference capacitance value of the touch detection point to be the temporary reference capacitance value; and in response to the second difference being greater than the second preset threshold, obtaining a third difference between the second difference and the first difference and determining the reference capacitance value of the touch detection point according to the third difference and a third preset threshold.

7. The touch apparatus according to claim 6, wherein the processor is configured to determine the reference capacitance value of the touch detection point according to the third difference and the third preset threshold by:

updating the reference capacitance value of the touch detection point to be the backup reference capacitance value when the third difference is less than the third preset threshold; and updating the reference capacitance value of the touch detection point to be the detected capacitance value when the third difference is greater than the third preset threshold.

8. The touch apparatus according to claim 7, wherein the processor is further configured to:

update reference capacitance values of other touch detection points of the touch screen to be the temporary reference capacitance value, when the second difference is less than the second preset threshold;

update reference capacitance values of other touch detection points of the touch screen to be the backup reference capacitance value, when the third difference is less than the third preset threshold; and update reference capacitance values of other touch detection points of the touch screen to be the detected capacitance value, when the third difference is greater than the third preset threshold.

9. The touch apparatus according to claim 7, wherein the processor is further configured to:

update the backup reference capacitance value to be the temporary reference capacitance value, when the second difference is less than the second preset threshold; and update the backup reference capacitance value to be the detected capacitance value, when the third difference is greater than the third preset threshold.

10. The touch apparatus according to claim 9, wherein the processor is further configured to:

update reference capacitance values of other touch detection points of the touch screen to be the temporary reference capacitance value, when the second difference is less than the second preset threshold;

update reference capacitance values of other touch detection points of the touch screen to be the backup reference capacitance value, when the third difference is less than the third preset threshold; and update reference capacitance values of other touch detection points of the touch screen to be the detected capacitance value, when the third difference is greater than the third preset threshold.

* * * * *